Dec. 27, 1938.    E. F. W. ALEXANDERSON    2,141,894
CABLE FOR TRANSMITTING ELECTRIC POWER
Filed March 19, 1937
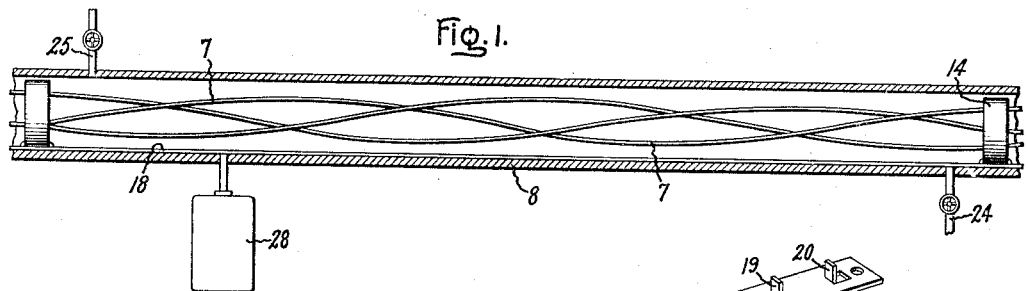
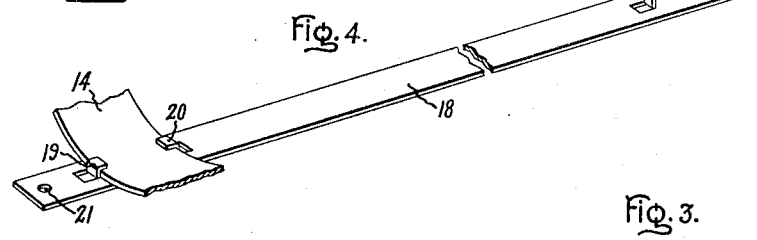
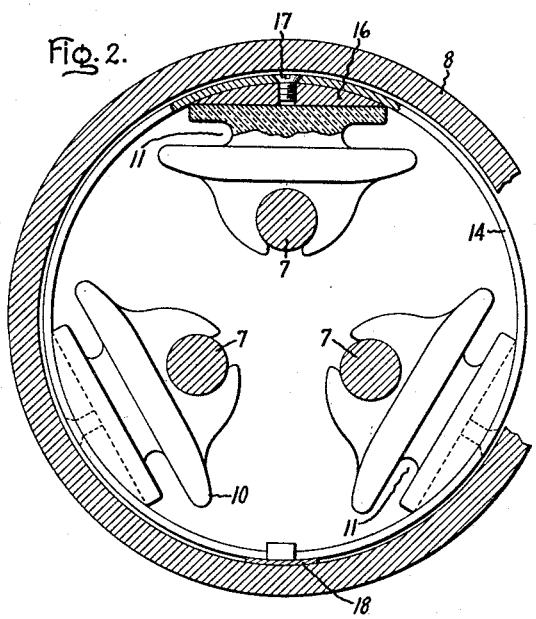
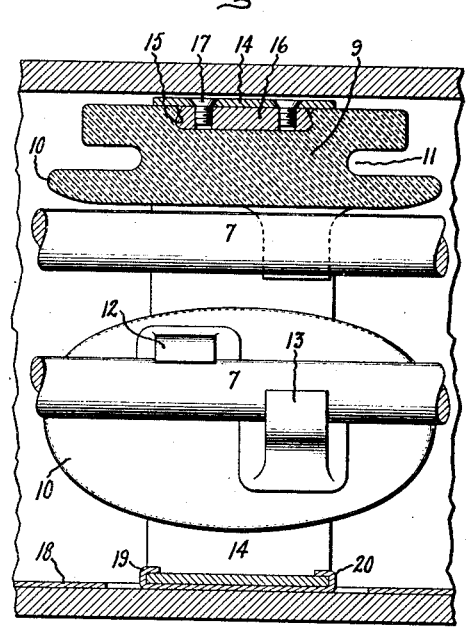
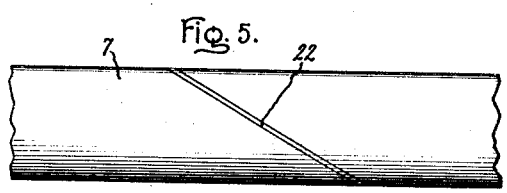
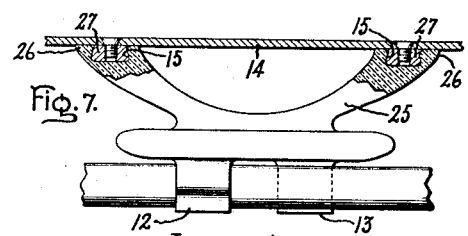
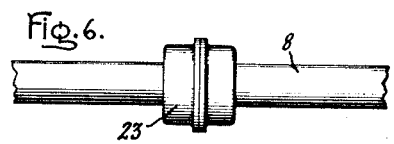
Inventor:
Ernst F. W. Alexanderson,
by Harry E. Dunham
His Attorney.

Patented Dec. 27, 1938

2,141,894

UNITED STATES PATENT OFFICE 2,141,894

CABLE FOR TRANSMITTING ELECTRIC POWER

Ernst F. W. Alexanderson, Schenectady, N. Y., assignor to General Electric Company, a corporation of New York Application March 19, 1937, Serial No. 131,896

6 Claims. (Cl. 247—3)

The present invention is directed to that type of cable in which the conductors are located within an impervious pipe, such as steel, to which insulating fluid under relatively high pressure is admitted and maintained for the purpose of insulating the conductor from the pipe which is at ground potential.

The object of my invention is the provision of an improved cable of the character above mentioned.

For a consideration of what I believe to be novel and my invention, attention is directed to the accompanying description and the claims appended thereto.

In the drawing, which is illustrative of my invention, Fig. 1 is a diagrammatic view of a length or section of a cable forming part of an electric transmission system; Fig. 2 is a cross-section of the cable; Fig. 3 is a longitudinal section of a portion of the cable and the conductor supports; Fig. 4 is a detail view of a means for spacing the conductor insulators and also for pulling the cable into the pipe line; Fig. 5 is a view in elevation showing how the conductor lengths are united; Fig. 6 is a detail view illustrating an expansion joint for the pipe lengths, and Fig. 7 is a modified form of insulator.

In carrying out my invention, solid rods 7 of copper or other suitable conducting material are employed to carry the current. They are made solid, as distinguished from being stranded, so as to be rigid and self-sustaining between the insulators. Being solid, they provide the maximum cross-section of metal for a given diameter. The conductors are not covered by insulating material, as is the practice for underground cables, but on the contrary are left bare. By the term uninsulated conductor as used hereinafter is meant one which has no insulation whatsoever as well as to one which for some reason has a covering of insulating material which is wholly ineffective to insulate the conductor carrying high tension current from the metal parts which are grounded or are operating at a greatly reduced potential. As an illustration but not as a limitation of my invention, the conductors may be of the order of one inch in diameter. Such conductors would, of course, expand and contract with temperature changes as would also the enclosing pipe 8. Usually the expansion ratios of the conductors and pipes will be unequal. It is important that the lengths of the conductor be solidly united into a continuous whole. Under the circumstances, if no means are provided to prevent it, the total change of length of the line conductors under temperature changes would be considerable. Under certain conditions of operating temperature, a straight copper rod of the character described may have an expansion of one-eighth of an inch in eight feet. To take care of this, the rods instead of being straight are spirally formed as by suitable rolling operation during their manufacture. As an illustration, the pitch of the spiral may be of the order of eight feet but my invention is not limited to the figure mentioned as it may be greater or less within reasonable limits. The pitch or distance between the supporting insulators of the conductor may be greater or less than the pitch of the spiral of the conductor. In other words, dissimilar pitches for the cable spiral and insulators is the preferred arrangement so as to give the whole structure mechanical stability. With a suitable spiral arrangement, any expansion or contraction of the conductor will have the effect of permitting the conductor between its insulating supports to move slightly in a generally radial direction over a wide area toward the wall of the enclosing pipe as it heats and away from it as it cools. Such an arrangement will fully compensate for the changes in length of conductor without imposing undue strains on any of the parts. In this manner, the arrangement as a whole is simple and the use of expansion joints entirely eliminated with a corresponding reduction in cost and the avoidance of poor electrical connections.

Referring particularly to Figs. 2 and 3, 8 indicates the steel pipe and 7 the bare or uninsulated conductors which carry high voltage current. Because it is necessary to install the conductors inside of the pipe as by moving one part longitudinally of the other and because it is necessary to have insulating supports, a special arrangement of parts is provided. Each conductor is supported at suitably spaced intervals by an insulator 9 of large surface area so as to reduce the tendency for current to creep from the conductor to the pipe which is at ground potential, said insulators occupying radial positions and extending toward the axis of the pipe. The insulators are made of molded material of which porcelain may be regarded as an example. They may be glazed or unglazed as best suited to the requirements. Each insulator is essentially elliptical in shape when viewed in front elevation. The portions 10 extend for a considerable distance longitudinally of the conductor. The creepage surface is enlarged by forming a deep peripheral groove 11 between the part of the insulator adjacent the conductor and that part nearest metal parts operating at ground potential. The enlarged or front face of the insulator is provided with a pair of spaced lugs 12 and 13 each of which has an approximately half round seat in which the conductor is seated. To apply the insulator, it is first turned to an angle of approximately 45° to the axis of the conductor and then moved toward the conductor and finally twisted or turned until both lugs engage the conductor as best shown in Fig. 3. In this position, the conductor is firmly held in position. In Fig. 2 is illustrated the three insulators necessary to support the three conductors, and which for convenience may be termed a set. In order to support the insulators in such manner that the conductors may be pulled into the pipe or the pipe slipped longitudinally over them, it being remembered that a relatively large number of insulators are required for each pipe length, the three insulators or set of insulators occupying the same relative position are supported by a relatively thin metal ring 14 which is slightly smaller than the inside diameter of the pipe so that it may be freely moved longitudinally thereof. As an example, the ring may be approximately one-sixteenth of an inch smaller than the bore of the pipe when the latter has a smooth inner wall. If such is not the case, the ring may be made somewhat smaller in diameter. The principal thing is to have the rings enough smaller than the pipe to permit of easy assembly. Because of the high potentials involved, the mounting of the insulators on the ring presents certain special considerations. The supporting metal parts should be kept as far away from the conductor as possible. To this end, the back or outer portion of each insulator has a channel or recess 15 with undercut side walls, Fig. 3, forming in effect a dovetail, the channel extending crosswise of the body of the insulator. In the channel or recess so formed is located a metal plate 16 which is desirably cemented or otherwise secured in place. Any suitable cement for the purpose may be used. The plate is flat on its inner surface so as to fit the channel or recess in the insulator and its outer surface is curved on the same radius as the ring as best shown in Fig. 2. The plate has two threaded openings to receive flatheaded screws 17 by means of which the plate is tightly secured to the ring 14. All of the insulators are similarly constructed and supported.

The next thing to be considered is the means for pulling the conductors, rings and insulators into the pipe, and this without disturbing their established relations, and especially the spacing of the rings. For this purpose, a thin but strong strip or ribbon of metal 18 is provided having struck-up lugs 19 and 20. The lugs are so spaced apart that they engage the opposite sides of the ring 14 when the latter is mounted in place. After the rings are assembled in place, the lugs are pressed or hammered down so as to hold the rings in place. The ends of the strip are provided with holes 21 to receive a wire for pulling the assembled conductors, rings and insulators into place.

In Fig. 7 is shown a modified form of insulator whereby the distance between the conductor and the metal parts supporting the insulator is substantially greater than in the construction previously described. The insulator is made of molded material as before and has lugs 12 and 13 for holding the conductor. Instead of having a metallic supporting plate such as 16 in the central region of the insulator, the latter is provided with two diverging legs 25 extending outwardly away from the main body of the insulator and which terminate in feet 26. In each foot is a recess 15 of dovetail formation in which is located a narrow plate 27 having the same characteristics as the plate 16 previously described. The plates are secured by screws or other means to the inner wall of the ring 14, the latter on account of the spacing of the legs and feet being somewhat wider than is required with the construction previously described.

The conductors and pipe will be so assembled that the ends of the conductors temporarily extend slightly beyond the end of the pipe length. The ends of the conductors thus exposed are then scarfed or cut on a bevel as indicated in Fig. 5 and subsequently united by silver solder 22 or equivalent means. As a result of this, the conductors throughout the length of the cable are solidly united. After the conductors are jointed, the adjacent ends of the pipes are brought together and electrically welded in any suitable way. Because of the high internal pressures involved, these joints should be carefully made so as to withstand the pressure without leakage.

As previously stated, the spiral or twist of the conductors will take care of the expansion and contraction of the conductors. To take care of such action of the pipe 8, a suitable number of expansion joints 23 are provided in the pipe line. The particular construction of these joints is not material so long as they are fluid tight. For this purpose, use may be made of the joints used with high pressure gas mains.

Prior to assembling the conductors within the pipe line, the latter should be thoroughly cleaned to remove foreign matter. Desirably the pipes are blown out with hot air or other gas to remove traces of moisture.

Having assembled the parts as above described and the ends of the pipe closed and the conductors connected to suitable insulating terminals at both ends, the next step is to charge the pipe with high pressure insulating gas. For this purpose, nitrogen gas or desirably a mixture of insulating gases may be used under a pressure of the order of 200 pounds per square inch. My invention is not, however, limited to said pressure since for some installations, higher or lower pressures may be employed, depending upon the operating conditions. The gas may be admitted from a suitable compressor to the pipe line by a valved conduit 24. In order to get rid of any free air within the pipe line before completely charging it, a limited amount of the charging gas may be permitted to escape through the valved conduit 25 along with the air. For convenience of illustration, these conduits are shown as entering the same length of pipe but ordinarily they will be widely spaced and connected to different lengths. To take care of any small leak which may exist from time to time, an accumulator 23 of suitable construction containing gas under pressure may be provided and permanently connected to the pipe line.

Among the advantages of my improved cable is the fact that its reactance is approximately one third of the reactance of an over head line of usual construction and its charging current is less than a third of that of an underground oil-filled cable. A 132 kv. cable of the type described has approximately the same electrical characteristics and load capacity as a 220 kv. overhead line.

What I claim as new and desire to secure by Letters Patent of the United States, is:

1. An electric cable comprising a metal pipe, an uninsulated conductor therein in spaced relation to the wall of the pipe, an insulator having spaced lugs on its front face for engaging and holding the conductor, a recess in the insulator on the back surface thereof, a metal plate in the recess, a metal ring capable of lengthwise movement with respect to the pipe, a means for uniting the ring and plate, and a body of insulating fluid under positive pressure which acts as the dielectric for the conductor.

2. An electric cable comprising a metal pipe, an uninsulated conductor within the pipe for conveying high tension current, an insulator having means on its inner face which engage and support the conductor, and spaced feet on the outer face, a metallic member forming a support for the feet, means for uniting the feet and member, and a body of insulating fluid under positive pressure filling the pipe.

3. An electric cable comprising jointed lengths of pipe, self sustained uninsulated conductors therein extending longitudinally thereof for conveying high tension current, each of the conductors in said length being of spiral form of relatively great pitch to compensate for expansion and contraction thereof due to temperature changes, joints between conductors for rigidly uniting them, radially positioned solid insulators of large surface area arranged in sets, each insulator being in spaced relation to the others and having means at its inner portion releasably engaging and supporting a conductor and a metal plate securely fastened to its outer portion, a ring of metal surrounding the insulators of each set and their respective plates, the ring being slightly smaller in diameter than the interior of the pipe, means for individually securing each of the plates to the ring, and a body of insulating gas under positive pressure within the pipe forming a dielectric for the uninsulated conductors.

4. An electric cable comprising jointed lengths of pipe, a plurality of self sustained, uninsulated conductors therein for conveying high tension current, joints for uniting adjacent ends of corresponding conductors, radially positioned insulators of elliptical form having large surface areas, the insulators being arranged in sets, each insulator being in spaced relation to the others and having lugs on its inner portion releasably engaging and supporting a conductor, a metal plate dove-tailed into the outer portion thereof, a relatively narrow ring of smaller diameter than the pipe surrounding each set of insulators, the ring being adapted to slide axially within the pipe, means for individually securing the plates to the ring for holding the insulators of the set in spaced angular relation, and a filling of high pressure gas for the pipe serving as a dielectric for the conductors.

5. An electric cable comprising jointed lengths of pipe, a plurality of self sustained, uninsulated conductors therein for conveying high tension current, joints for uniting adjacent ends of corresponding conductors, each having an enlarged surface area at its inner portion, a deep peripheral groove adjacent thereto on the side toward the pipe for increasing the creepage surface for the current and a second crosswise extending groove in the outer portion, spaced lugs on the inner portion of the insulator engaging and supporting a conductor, a relatively narrow plate secured to the outer portion of the insulator and located in the second groove, the plate having a flat inner face engaging with the insulator and a curved outer face, a ring of metal surrounding the insulators of each set and engaging the curved faces of the plates, means independently fastening each of the plates to the inner surface of the ring, and a filling of high pressure insulating gas for the pipe.

6. An electric cable comprising jointed lengths of pipe, a plurality of self sustained, uninsulated conductors therein for conveying high tension current, joints for uniting adjacent ends of corresponding conductors, radially positioned insulators extending toward a common center and arranged in sets, each insulator having lugs on its inner part engaging and supporting a conductor, a crosswise groove in its outer part and a metal plate anchored in the groove, a metal ring surrounding each set of insulators, means for securing the plates of each set to the inner surface of the ring, a thin strip of metal extending longitudinally of the pipe having means engaging the rings for holding them in spaced relation, the strip also serving as a means for pulling the rings and the parts supported thereby into the pipe.

ERNST F. W. ALEXANDERSON.